United States Patent [19]
Cho

[11] Patent Number: 5,545,950
[45] Date of Patent: Aug. 13, 1996

[54] ADAPTER, FITTING INTO AN INCANDESCENT SOCKET, FOR RECEIVING A COMPACT FLOURESCENT LAMP

[76] Inventor: Sung H. Cho, 100-4 Onsu-dong, Kuro-gu, Seoul, Rep. of Korea

[21] Appl. No.: 251,580

[22] Filed: May 31, 1994

[30] Foreign Application Priority Data

Nov. 5, 1993 [KR] Rep. of Korea ................. 1993-23092

[51] Int. Cl.[6] ..................................... H01J 7/44
[52] U.S. Cl. .................. 315/56; 315/58; 313/318.01; 439/226; 439/236; 439/336; 439/646; 439/56; 362/226; 362/260
[58] Field of Search ................................. 315/56, 58, 57, 315/71; 362/221, 226, 260; 439/56, 646, 236, 226, 239, 242, 336, 360, 375, 414, 339; 313/318.01

[56] References Cited

U.S. PATENT DOCUMENTS

| | | | |
|---|---|---|---|
| 4,495,443 | 1/1985 | Cummings | 315/58 |
| 4,647,820 | 3/1987 | Chermin et al. | 375/245 |
| 4,688,874 | 8/1987 | Bjorkman | 439/646 X |
| 4,761,585 | 8/1988 | Linnman et al. | 315/309 |
| 4,931,696 | 6/1990 | Brower | 315/58 |
| 4,961,027 | 10/1990 | Muesli | 315/58 |
| 5,015,917 | 5/1991 | Nigg | 315/56 |
| 5,164,635 | 11/1992 | De Jong et al. | 315/58 |
| 5,189,339 | 2/1993 | Peshak | 315/58 |
| 5,320,548 | 6/1994 | Schadhauser | 439/236 |
| 5,336,116 | 8/1994 | Boteler | 439/690 |

*Primary Examiner*—Robert Pascal
*Assistant Examiner*—Arnold Kinkead
*Attorney, Agent, or Firm*—Michaelson & Wallace; Peter L. Michaelson; John C. Pokotylo

[57] ABSTRACT

A ballast device for a compact fluorescent lamp with: a ballast case including an outer case (17) and a socket substrate (11), the outer case having an incandescent lamp base (19) at its top portion, the substrate having a compact fluorescent lamp socket and a bottom portion of the outer case being assembled with the socket substrate; a first printed circuit board (PCB) (15) on which electronic circuit components (15-2) are mounted and having a first receiving cavity (15-1) for allowing the fluorescent lamp socket to be inserted therein; and a second PCB (16) on which other electronic circuit components are mounted, with the latter mounted components, that have a relatively high height, being situated in a center area of the second PCB, thus located within the bulb base.

9 Claims, 4 Drawing Sheets

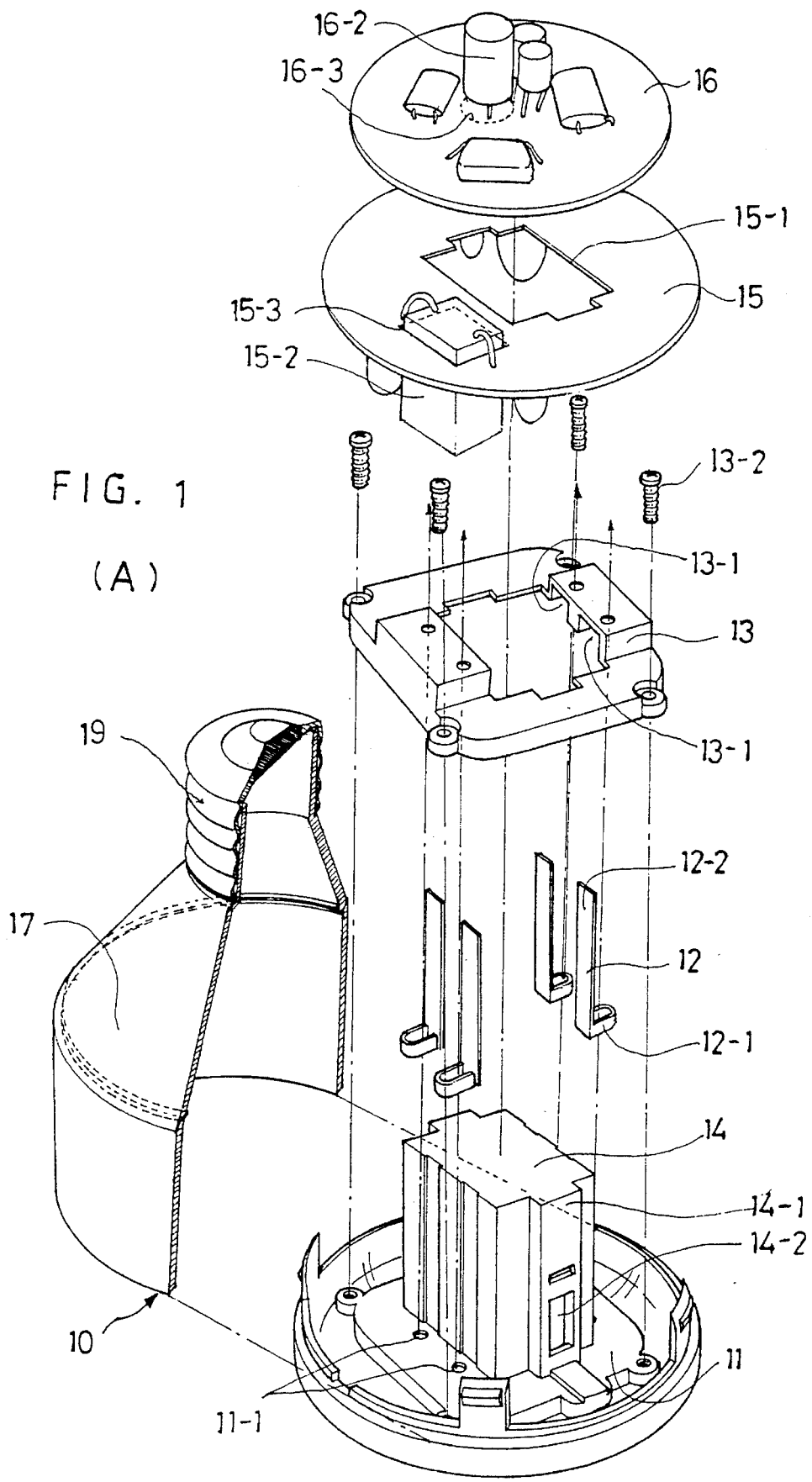

(B)

ADAPTER, FITTING INTO AN INCANDESCENT SOCKET, FOR RECEIVING A COMPACT FLOURESCENT LAMP

FIELD OF THE INVENTION

This invention relates to a compact fluorescent lamp apparatus having a ballast, which has a socket for the compact fluorescent lamp and thus enables the lamp to be inserted into commercial incandescent bulb base.

BACKGROUND OF THE INVENTION

A fluorescent lamp (FL) has a high efficiency in emitting light. Thus, in order to use the FL lamp instead of a incandescent lamp, a size of the FL lamp is made to be small. Trying to insert the small fluorescent lamp or the like into a bulb socket of the incandescent lamp results in further reduction of the lamp apparatus size including an electronic ballast.

FIG. 2 shows a conventional compact fluorescent lamp apparatus having a ballast 22 without a compact fluorescent lamp socket, a small fluorescent lamp 23 and a bulb base 21, which are integrated in one unit.

However, although the small lamp apparatus is convenient to use, both the socket and ballast are to be replaced with a new one in case where a life of a fluorescent lamp is ended, therefore causing a source of waste material.

As shown in FIG. 3, a compact fluorescent lamp has been commercially available which has a plug that can be inserted into a socket in a socket-type ballast so as not to waste the materials.

For the compact fluorescent lamp, many types of ballast are produced. One such type of electronic ballast has a socket for accommodating the compact fluorescent lamp, and an incandescent bulb base for connection to an incandescent socket.

However, a size of the conventional electronic ballast having a compact fluorescent lamp socket and a bulb base is large and inconvenient for use.

SUMMARY OF THE INVENTION

It is an object of the invention to provide a ballast device for a compact fluorescent lamp which can to maintain compatibility with the conventional products with respect to the socket size for both of the bulb base and compact fluorescent lamp plug, and to reduce the size of the ballast case.

The ballast device includes a ballast case including an outer case and a socket substrate, a first printed circuit board(PCB), and a second PCB.

The outer case has an incandescent lamp base (bulb base) at its top portion, the socket substrate has a compact fluorescent lamp socket, and a bottom portion of the outer case is assembled with said socket substrate.

The first PCB has electronic circuit components mounted thereon and has a first receiving portion for a fluorescent lamp socket formed in the socket substrate to be inserted.

The second PCB has electronic circuit components mounted thereon, and the mounted components having a long height are located in center area of the second PCB in order to utilize space of the bulb base of the outer case.

The electronic circuit components mounted on the first PCB are disposed around the side space of the fluorescent lamp socket, and the electronic circuit components mounted on the second PCB are disposed inside the bulb base.

Further a second receiving cavity is formed in an area of the first PCB so that the components having long length can be inserted through the second receiving cavity.

The electronic circuit components of a long length are disposed in the vicinity of the second PCB center area so that said electronic components having a long length can be located inside the incandescent lamp base.

The second PCB has a smaller diameter than the first PCB, and the second PCB is located at a position in a region where a diameter of the outer case is decreasing.

The second PCB has a rectifier which receives power through power supply lines from the incandescent lamp base.

It is an another object of the present invention to provide a socket for a compact fluorescent lamp having: a socket substrate having two pairs of through holes for accepting pins of a compact FL lamp, and having a receiving portion of a FL lamp socket plug; two pairs of terminals for connecting the pins of the FL lamp to a ballast circuit; and a socket upper plate having receiving and into which are located cavities for receiving top portions of the terminals.

When the upper plate of the socket is assembled with the socket substrate using coupling means, the terminals serve as a limiting means for fixing a PCB having a ballast circuit.

DETAILED DESCRIPTION OF THE PREFERRED EMBODIMENT OF THE INVENTION

Figure 1:
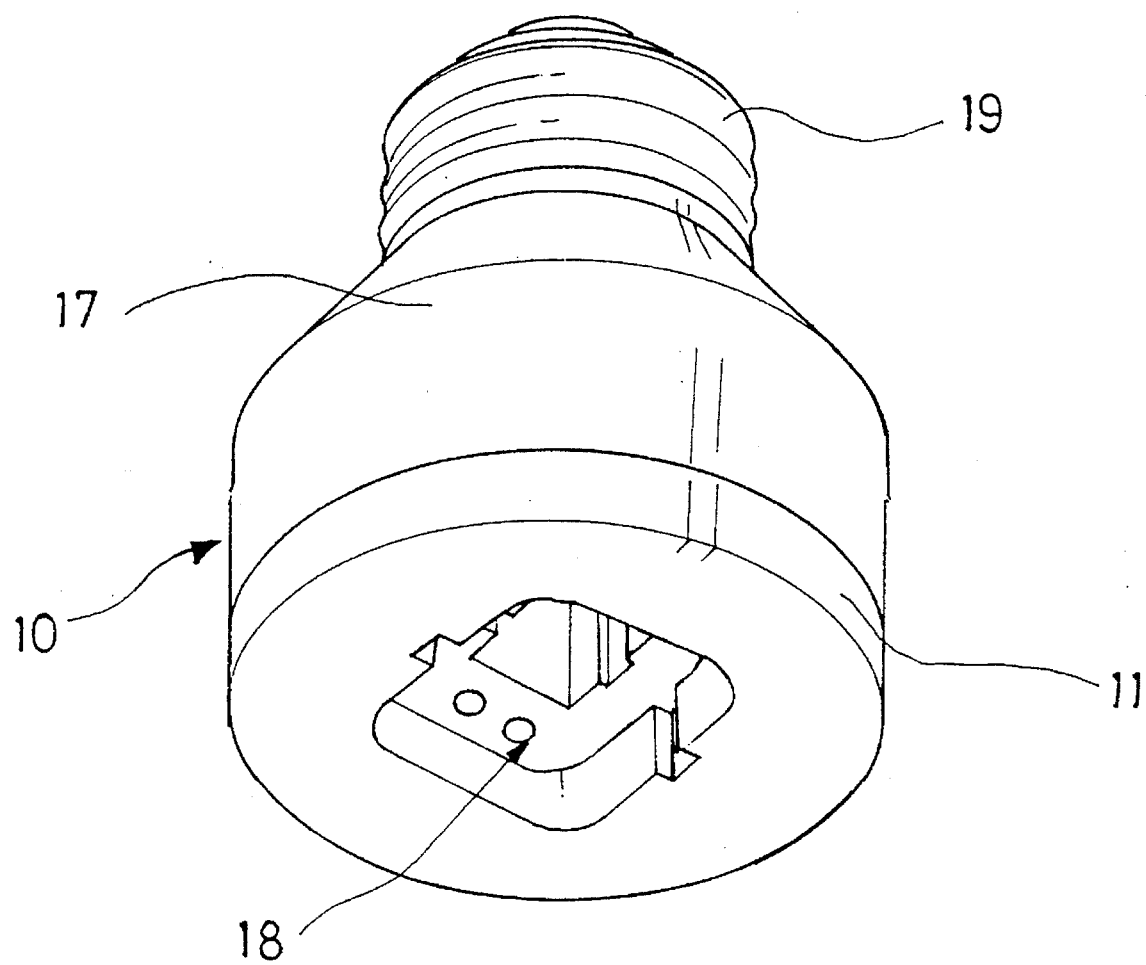
FIG. 1A is a perspective view showing a disassembled ballast device for a compact fluorescent lamp according to the present invention.
FIG. 1B is a perspective view showing an assembled ballast device according to the present invention.
Figure 2:
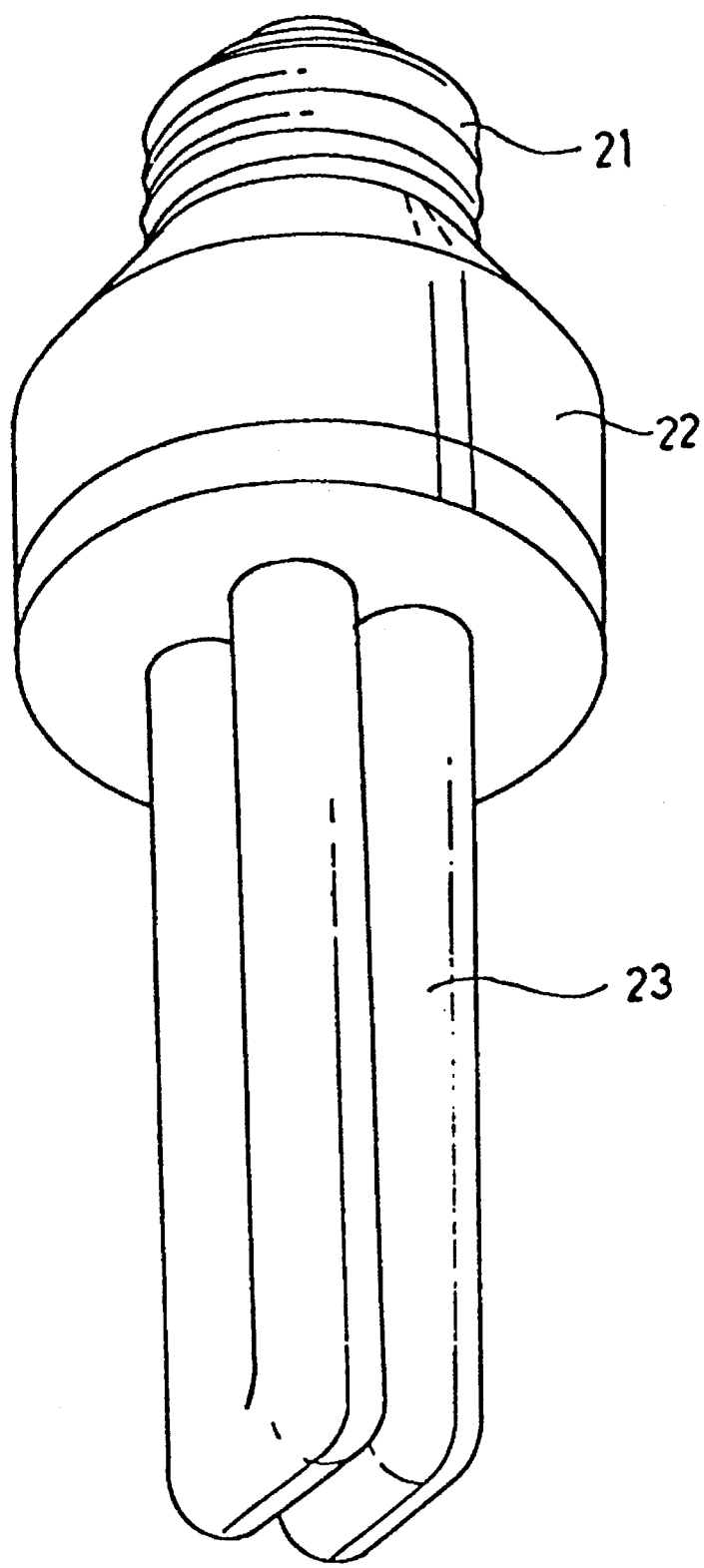
FIG. 2 is a perspective view showing a conventional small fluorescent lamp having a ballast and incandescent bulb base without a compact fluorescent lamp socket.

As shown in FIG. 1A, components constituting the ballast, including its power rectifier are mounted on each of two Printed Circuit Boards(PCB) having a first PCB on which the electric components are mounted and then disposed on the side surface of a plug receiving portion which receives a plug of a compact lamp, and a second PCB on which the components are mounted and then disposed inside a bulb base, fully using the space in a ballast case.

There is provided with a component receiving cavity or second receiving cavity in a selected area of a PCB so that an electric component having a long length mounted on the other PCB can be inserted through one of the selected areas of the PCB in the case that the lengths of the electric components are enough to reach an end of the space. In order to make it easy for the long components to be mounted on either PCB, the PCBs have a plurality of component receiving cavities.

Further, the first PCB has a hole for inserting the lamp socket plug receiving portion.

The compact fluorescent lamp socket of a preferred embodiment includes a socket substrate 11 having two pairs of through holes 11-1 for inserting pins of a fluorescent lamp plug, two pairs of terminals 12 which contact with pins 29 of the lamp plug inserted into said through holes and a socket upper plate 13 which has a receiving cavity 13-1 receiving the top portions 12-1 of the terminals and is coupled with the substrate 11, thus locating the terminal top portions in desired positions.

Each of a tail 12-2 of the terminal 12 is connected to a terminal on a predetermined position of the first PCB 15, such as by soldering.

Figure 3:
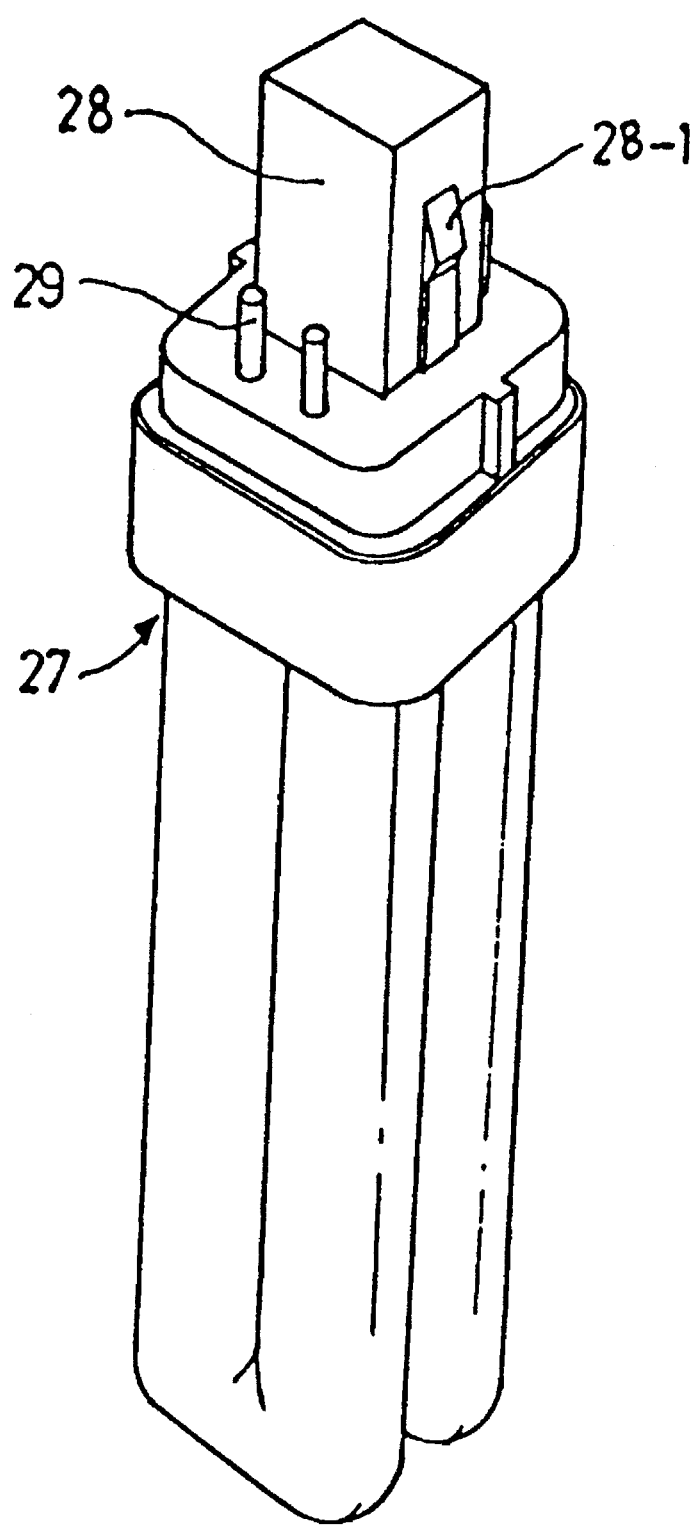
FIG. 3 is a perspective view showing a conventional compact fluorescent lamp.

The socket substrate 11, which constitutes a ballast case 10 with an outer case 17, has a socket receiving part 14 so as to receive the socket plug 28, which is shown in FIG. 3A, of the compact fluorescent lamp.

Inside the socket receiving part 14 is installed a locking spring 14-2 which receives and locks a protrusion 28-1 of the socket plug 28.

The first PCB 15 includes the first receiving cavity 15-1 formed in a center area of the PCB 15 where a top portion 14-1 of the socket receiving part 14 may be inserted into, and the second receiving cavity 15-3 for receiving the electric component of a long length, such as the condenser, transformer or the like. As shown, the electronic component extends away from the second PCB 16.

The second PCB 16 has a smaller diameter than the first PCB 15 and is located at a certain position where the diameter of the outer case 17 is decreasing. In the second PCB 16, electronic components 16-2 of a long length are located at a center area of the second PCB 16 so as to make these components occupy volume inside the bulb base 19, thus electronic components having a long length can be located inside the bulb base 19.

And the second PCB 16 also may have the first receiving cavity 16-3 receiving the electric components 16-2 of a long length, such as the condenser, transformer or the like.

When the upper plate 13 of the socket is assembled with the socket substrate through coupling means such as the screw 13-2, the tails 12-2 of terminals 12 act as limiting means such that the first PCB 15 is prevented from moving upwardly. The terminal of course is made of a conductive material.

The second PCB 16 has a rectifier which receives the power through the power supply lines from the bulb base 19 and is connected to the first PCB 15 by a conductive lead, rod, wire, or the like (not specifically shown).

The electrical wiring connects a pair of power lines from the bulb base 19 to the rectifying means in the second PCB 16 which outputs a rectified DC power connected to the well-known ballast circuit in the first PCB for the fluorescent lamp.

The ballast circuit generates high frequency power and is connected to the FL lamp for lighting the FL lamp through the terminals 12.

After the electrical wiring is connected, the outer case 17 is assembled with the socket substrate 11, thus completing the assembly of the ballast case 10.

The device can be used by inserting the compact fluorescent lamp 27 into the socket receiving part 14, with the bulb base being inserted into a bulb socket which is already installed on a wall or lamp stand.

With the compatibility with the conventional lamp apparatus with respect to the socket size for both of the bulb base and compact fluorescent lamp, the ballast case is reduced in size which, in turn, increases the usefulness for the inventive lamp apparatus.

It is possible to replace the consumed lamp with a new one and continue to use ballast in the apparatus, thereby saving the materials and costs.

I claim:

1. A ballast device for a compact fluorescent lamp comprising:

a ballast case having an outer case and a socket substrate, the outer case having a top portion at which an incandescent lamp base is situated, the socket substrate having a compact socket, adapted to accept a compact fluorescent lamp, formed thereon, wherein a bottom portion of the outer case is assembled with said socket substrate, wherein the ballast case further comprises first and second printed circuit boards mounted within the outer case and situated above the socket substrate, and wherein a top portion of the outer case is substantially cylindrical and a bottom portion of the outer case, between the top portion and a bulb base, is substantially frustoconical;

the first printed circuit board, onto which a first plurality of electronic components are mounted, having a first receiving cavity for inserting therethrough the fluorescent lamp socket; and the second printed circuit board mounted above the first printed circuit board within the bottom portion of the outer case and having a second plurality of electronic components mounted thereon such that ones of said second plurality of electronic components having increased height over remaining electronic components thereof are centrally located on the second printed circuit board in order to extend into and occupy space within the incandescent lamp base, wherein the first printed circuit board further comprises a second receiving cavity through which one of said first plurality of electronic components that has an increased height over other ones thereof is mounted such that the one of the first plurality of electronic components extends away from the second printed circuit board.

2. An adapter for receiving a compact fluorescent lamp and fitting into an incandescent socket, the adapter comprising:

a) a socket substrate having a top side and a bottom side, the bottom side having a socket receiving part which defines a cavity having an open end on the top side of the socket substrate for receiving a socket plug of the compact fluorescent lamp, wherein a plurality of holes are defined from the top side to the bottom side of the socket substrate for permitting pins of the compact fluorescent lamp to pass through the socket substrate;

b) a ballast case having a substantially cylindrical upper portion coupled with a peripheral region of the socket substrate, a bulb base, adapted to fit into the incandescent socket, at its lower portion, and a frustoconical section arranged between the upper portion of the ballast case and the bulb base of the ballast case;

c) a socket upper plate having a top side coupled with the bottom side of the socket substrate and having a plurality of receiving cavities defined therein, and a bottom side, wherein the socket receiving part of the socket substrate extends through a central receiving cavity formed in the socket upper plate, and wherein a plurality of holes, aligned with the plurality of holes defined in the socket substrate, are defined in the socket upper plate;

d) a plurality of terminals, each of the plurality terminals having a top portion and a tail, the top portion of each of the plurality of terminals held in a respective one of the receiving cavities of the socket upper plate;

e) a first printed circuit board having an upper side adjacent to the lower side of the socket upper plate and having a lower side, wherein the socket receiving part of the socket substrate extends through a central receiving cavity formed in the first printed circuit board, and wherein an electrical component of the first printed circuit board extends through a peripheral cavity defined in the printed circuit board; and f) a second printed circuit board having an upper side adjacent to the lower side of the first printed circuit board and having a lower side provided with a plurality of electrical components, wherein at least one of the plurality of electrical components, which is longer than all other of the plurality of electrical components is arranged in a central region of the second printed circuit board, and wherein the second printed circuit board is arranged within the substantially frustoconical section of the ballast case.

3. The adapter of claim 2 wherein the top portion of the each of the plurality of terminals is U-shaped.

4. The adapter of claim 3 wherein the holes defined in the socket substrate, the U-shaped top portions of the plurality of terminals, and the holes defined in the socket upper plate are aligned for permitting the pins of the fluorescent lamp to pass through.

5. The adapter of claim 4 wherein the plurality of terminals are dimensioned such that they contact the pins of the fluorescent lamp.

6. The adapter of claim 2 wherein the tails of the plurality of terminals are soldered to contacts of the first printed circuit board such that they prevent the first printed circuit board from moving towards the socket upper plate.

7. The adapter of claim 2 wherein, in each of the plurality of terminals, the tail extends from the top portion, through the central receiving cavity formed in the socket upper plate.

8. The adapter of claim 2 further comprising screws which fasten the socket upper plate to the socket substrate.

9. The adapter of claim 2 wherein the socket receiving part includes a locking spring for receiving a protrusion of the fluorescent tube.

\* \* \* \* \*